(12) United States Patent
Yoon et al.

(10) Patent No.: US 7,778,658 B2
(45) Date of Patent: Aug. 17, 2010

(54) FAST POWER CONTROL STEP-SIZE ADAPTATION

(75) Inventors: Young C. Yoon, San Diego, CA (US); Sang G. Kim, San Diego, CA (US); Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 748 days.

(21) Appl. No.: 11/620,006

(22) Filed: Jan. 4, 2007

(65) Prior Publication Data

US 2007/0173278 A1    Jul. 26, 2007

Related U.S. Application Data

(60) Provisional application No. 60/756,350, filed on Jan. 4, 2006, provisional application No. 60/786,920, filed on Mar. 28, 2006.

(51) Int. Cl.
*H04B 7/00* (2006.01)
(52) U.S. Cl. .................... 455/522; 455/69; 370/318
(58) Field of Classification Search .............. 455/69, 455/522; 370/318
See application file for complete search history.

(56) References Cited

U.S. PATENT DOCUMENTS

| | | | |
|---|---|---|---|
| 5,896,411 A * | 4/1999 | Ali et al. ................ | 375/130 |
| 6,587,442 B1 | 7/2003 | Tripathi | |
| 7,496,070 B2 * | 2/2009 | Vesuna .................. | 370/331 |
| 2002/0115461 A1 * | 8/2002 | Shiraki et al. .......... | 455/522 |
| 2005/0152320 A1 * | 7/2005 | Marinier et al. ........ | 370/338 |

FOREIGN PATENT DOCUMENTS

| | | |
|---|---|---|
| KR | 1020010038528 | 5/2001 |
| WO | WO 98/51026 A1 | 11/1998 |
| WO | WO 01/31824 A1 | 5/2001 |
| WO | WO 02/27968 A2 | 4/2002 |

OTHER PUBLICATIONS

Ye, F. et al.: "A Simple Adaptive Up-Link Power Control Algorithm for DS/CDMA System." In: IEEE/AFCEA Conference on Information Systems for Enhanced Public Safety and Security, EUROCOMM 2000, New York: IEEE, May 17, 2000, pp. 16-19, XP010515031, ISBN 0-7803-6323-X.

Suda, H. et al.: "A Fast Transmit Poer Control Based on Markov Transition for Ds-DCMA Mobile Radiio." In: IEEE International Conference on Universal Personal Communications, ICUPC '98, New York: IEEE, Oct. 5, 1998, vol. 1, pp. 235-239, XP010314876, ISBN 0-7803-5106-1 abstract, sections 1,2.

* cited by examiner

*Primary Examiner*—Raymond S Dean
(74) *Attorney, Agent, or Firm*—Lee, Hong, Degerman, Kang & Waimey (57) ABSTRACT

A mobile terminal for communicating with a network entity includes a RF module for communicating with the network entity, a display for displaying information to a user, a memory for storing data relating to operation of the mobile terminal, and a processor. The processor may be configured to adjust power control step size of the mobile terminal by receiving signal condition data from the network entity, and adjusting the power control step size based on the signal condition data. The mobile terminal may also be configured to operate with 1xEV-DO systems.

10 Claims, 9 Drawing Sheets

|  |  | Received Power Control Command | |
|---|---|---|---|
|  |  | UP | DOWN |
| 1st ACKCH response | ACK | 0.5 | 1.5 |
|  | NAK | 0.5 | 0.5 |
| 2nd ACKCH response | ACK | 0.5 | 1.0 |
|  | NAK | 1.0 | 0.5 |
| 3rd ACKCH response | ACK | 0.5 | 0.5 |
|  | NAK | 1.5 | 0.5 |

FIG. 4

| ACKCH | Value | System load indicator (reverse activity bit) | |
|---|---|---|---|
| | | LOW | HIGH |
| 1st ACKCH response | ACK | 0.5 | 1.5 |
| | NAK | 0.5 | 0.5 |
| 2nd ACKCH response | ACK | 0.5 | 1.0 |
| | NAK | 1.0 | 0.5 |
| 3rd ACKCH response | ACK | 0.5 | 0.5 |
| | NAK | 1.5 | 0.5 |

FIG. 5

| ACKCH | Value | Channel quality indicator (DRC lock condition) | |
|---|---|---|---|
| | | NO LOCK | LOCK |
| 1st ACKCH response | ACK | 0.5 | 1.5 |
| | NAK | 0.5 | 0.5 |
| 2nd ACKCH response | ACK | 0.5 | 1.0 |
| | NAK | 1.0 | 0.5 |
| 3rd ACKCH response | ACK | 0.5 | 0.5 |
| | NAK | 1.5 | 0.5 |

FIG. 6

| AN commands ($t_{n-1}$, $t_n$) | MT response |
|---|---|
| ++ | +2.0dB |
| -+ | +1.0dB |
| -- | -2.0dB |
| +- | -1.0dB |

FIG. 7

| AN1 commands ($t_{n-1}$, $t_n$) | AN2 commands ($t_{n-1}$, $t_n$) | MT response |
|---|---|---|
| ++ | ++ | +2.0dB |
| ++ | -+ | +1.5dB |
| ++ | -- | -0.0dB |
| ++ | +- | +0.5dB |
| -+ | ++ | +1.5dB |
| -+ | -+ | +1.0dB |
| -+ | -- | -0.5dB |
| -+ | +- | -0.0dB |
| -- | ++ | +0.0dB |
| -- | -+ | -0.5dB |
| -- | -- | -2.0dB |
| -- | +- | -1.5dB |
| +- | ++ | +0.5dB |
| +- | -+ | +0.0dB |
| +- | -- | -1.5dB |
| +- | +- | -1.0dB |

FAST POWER CONTROL STEP-SIZE ADAPTATION

CROSS-REFERENCE TO RELATED APPLICATIONS

This Application claims benefit of priority from provisional patent application Ser. No. 60/756,350, filed on Jan. 4, 2006, and provisional patent application Ser. No. 60/786,920, filed on Mar. 28, 2006, which are hereby incorporated by reference herein in their entirety.

BACKGROUND OF THE INVENTION

1. Field of the Invention

The present invention relates generally to methods of power control for mobile terminals, and in particular to methods for adjusting power control step size for a mobile terminal.

2. Discussion of the Related Art

Numerous access schemes exist to allow multiple users to share a communication medium. One such access scheme is known as code division multiple access (CDMA). In CDMA systems, multiple users share the same carrier frequency and may transmit simultaneously.

The current standard for CDMA systems is contained in specifications published by the Telecommunications Industry Association and Electronics Industry Association (TIA/EIA), and include IS-95A, IS-95B, and other CDMA-type protocols. New standards for wideband CDMA have been developed and offer significant performance improvements compared to the current CDMA standard. One such standard is known as cdma2000. cdma2000 is a wideband, spread-spectrum radio interface that uses CDMA technology to satisfy the needs of third generation wireless communication systems. Several enhancements of the cdma2000 standard have been developed to facilitate the gradual evolution of third generation wireless communication systems. The cdma2000 variant known as 1xEV-DO is being developed to provide high-speed packet data services as an overlay to existing circuit-switched networks.

One functional aspect of a CDMA system relates to power control. Power control is used on the reverse link in CDMA systems to control the power of signals received at each base station from the mobile terminals. One purpose of power control is to assure that each mobile terminal served by a particular base station provides approximately the same signal level to the receiver at that sector. In CDMA systems, system capacity is maximized if the transmit power level of each mobile terminal is controlled so that its signals arrive at the base station receiver with the minimum required signal-to-noise ratio (SNR) or signal-to-interference ratio (SIR). The target value for the received power level is the minimum level possible that allows the link to meet the predetermined performance objectives.

As the mobile terminal moves around within the network, the channel conditions change continuously due to fast and slow fading, shadowing, number of users, external interference, and other factors. Conventional power control algorithms dynamically control the transmitted power on the reverse link to maintain the minimum SNR or SIR at the base station. Both open loop and closed loop power control are typically used on the reverse link. In open loop control, the mobile terminal monitors the received signal strength on the forward link and varies its transmit power inversely in proportion to the measured signal strength. Fast power control is provided by the closed loop power control mechanism. In closed loop power control, the base station measures the strength of the received signal from the mobile terminal and sends power control commands to the mobile terminal requesting the mobile terminal to either increase or decrease its transmit power.

Current standards permit adjusting of transmission power of a mobile terminal, for example, according to defined step sizes. However, selection or adjustment of the step size is typically accomplished using upper layer messaging, which is slow to react to quickly changing channel conditions.

SUMMARY OF THE INVENTION

In accordance with an embodiment, a method for adjusting power control step size of a mobile terminal includes receiving signal condition data from a network entity and adjusting the power control step size based on the signal condition data.

In one aspect the signal condition data includes power level commands which individually include either a power UP command indicating that the mobile terminal is to increase power, or a power DOWN command indicating that the mobile terminal is to decrease power. In this aspect, the method further includes increasing the step size if a first predetermined consecutive number of power level commands include a power UP command, and decreasing the step size if a second predetermined consecutive number of power level commands include a power DOWN command.

In one aspect, the signal condition data includes transmission control information parameters which all include either an ACK or NACK. The adjusting operation further includes increasing the step size if a first predetermined consecutive number of transmission control information parameters include a NACK, and decreasing the step size if a second predetermined consecutive number of transmission control information parameters include an ACK. The ACK or NACK signal typically is in response to a packet data channel on the corresponding link (e.g, ACK/NACKs for responding to a forward link packet data channel) to support automatic repeat transmission (ARQ). An ACK or NACK is sent to indicate whether a packet has been successfully and unsuccessfully decoded, respectively.

In another aspect the signal condition data includes transmission control information parameters which all include either an ACK or NACK. The adjusting operation further includes receiving power level commands from the network entity which all include either a power UP command or a power DOWN command. The step size is increased if a first predetermined consecutive number of power level commands include a power UP command and a second predetermined consecutive number of the transmission control information parameters include a NACK, and the step size is decreased if a third predetermined consecutive number of the power level commands include a power DOWN command and if a fourth predetermined consecutive number of the transmission control information parameters include an ACK.

In yet another aspect, the signal condition data includes a channel quality indicator which includes either a lock or no lock condition. The adjusting operation further includes increasing the step size if the channel quality indicator indicates a no lock condition for a first predetermined time period, and decreasing the step size if the channel quality indicator indicates a lock condition for a second predetermined time period. In certain systems, this can also be referred to as a data rate control (DRC) lock indicator.

In still yet another aspect, the signal condition data includes transmission control information for subpackets transmitted in a plurality of packet transmissions, in which the transmission control information for each of the plurality of packet transmissions include either an ACK or a NACK. In this aspect, the adjusting operation further includes receiving a power level command for each of the plurality of packet transmissions from the network entity, in which each of the power level commands include a power UP command or a power DOWN command. The adjusting further includes increasing the step size if transmission control information associated with a first or second subpacket of the plurality of packet transmissions includes an ACK, and a power level command associated with the first or second plurality of packet transmissions includes a power DOWN command, or transmission control information associated with a last-received subpacket of the plurality of packet transmissions includes a NACK, and a power level command associated with the last-received subpacket includes a power UP command.

According to one feature, the signal condition data includes transmission control information for subpackets transmitted in a plurality of packet transmissions, in which the transmission control information for each of the plurality of packet transmissions include either an ACK or a NACK. In this aspect, the adjusting further includes decreasing the step size if transmission control information associated with a first subpacket of the plurality of packet transmissions includes an ACK.

According to another feature, the signal condition data includes transmission control information for subpackets transmitted in a plurality of packet transmissions, in which the transmission control information for each of the plurality of packet transmissions include either an ACK or a NACK. In this aspect, the adjusting further includes decreasing the step size if transmission control information associated with a first subpacket of the plurality of packet transmissions includes an ACK and a power level command associated with the first subpacket includes a power DOWN command.

According to yet another feature, the signal condition data includes a system load indicator, such that the adjusting only occurs if the system load indicator indicates loading of the network which falls below a predefined threshold level. For example, such a system load indicator is sometimes referred to as a reverse activity bit (RAB), rise-over-thermal (ROT) or interference-over-thermal (IOT) indicator, The strategy in this example is that if the load is high, then power control step size changes should be minimized to prevent system instability. Otherwise, if the load is low, then power control step size change can operate freely.

According to still yet another feature, the adjusting includes determining step size transition probabilities for each of a plurality of step sizes based upon the signal condition data, and increasing or decreasing the step size based upon the transition probabilities.

With this approach, the step-size change is probabilistic rather than deterministic.

In accordance with an alternative embodiment, a method for calculating power control step size of a mobile terminal includes determining signal condition data relating to the mobile terminal, adjusting the power control step size based on the signal condition data, and communicating the power control step size to the mobile terminal.

In accordance with another alternative embodiment, a mobile terminal for communicating with a network entity includes a RF module for communicating with the network entity, a display for displaying information to a user, a memory for storing data relating to operation of the mobile terminal, and a processor. The processor may be configured to adjust power control step size of the mobile terminal by receiving signal condition data from the network entity, and adjusting the power control step size based on the signal condition data.

BRIEF DESCRIPTION OF THE PREFERRED DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1:
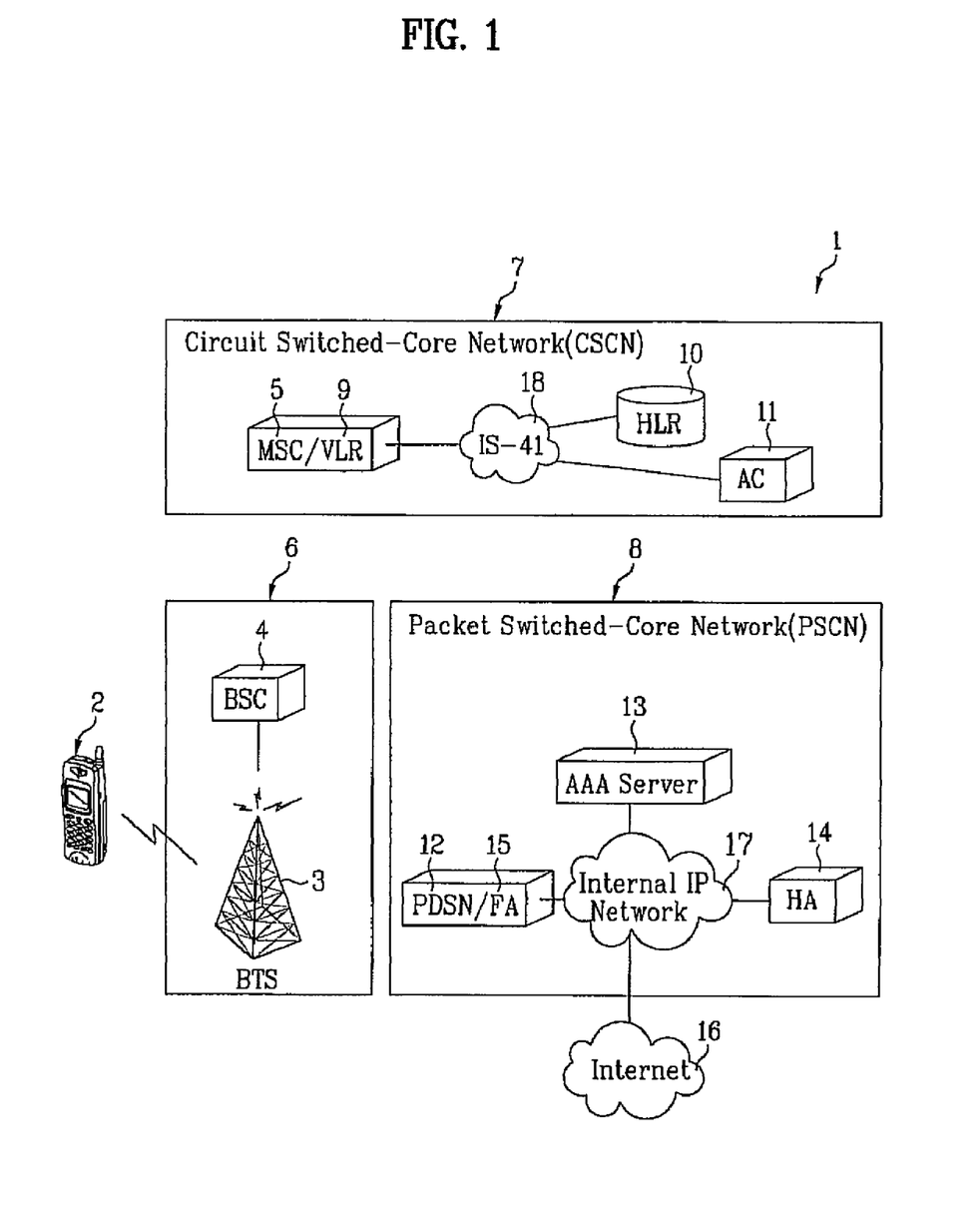
FIG. 1 depicts a wireless communication network in accordance with an embodiment of the present invention.

Referring to FIG. 1, a wireless communication network 1 is illustrated. A subscriber uses mobile terminal 2 to access network services. Mobile terminal 2 may be a portable communications unit, such as a hand-held cellular phone, a communication unit installed in a vehicle, or a fixed-location communications unit.

Electromagnetic waves from mobile terminal 2 are transmitted along a reverse link to base transceiver system (BTS) 3, which is also known as node B. The BTS includes radio devices such as antennas and equipment for transmitting radio waves. Access network 6 includes a base station controller (BSC) 4 which receives transmissions from one or more BTSs. The BSC provides control and management of the radio transmissions from each BTS by exchanging messages with the BTS and mobile switching center (MSC) 5 or internal IP network 17.

Access network 6 exchanges messages with, and transmits data to, a circuit switched core network (CSCN) 7 and packet switched core network (PSCN) 8. The CSCN provides traditional voice communications, and the PSCN provides Internet applications and multimedia services.

MSC 5 provides switching for traditional voice communications to and from mobile terminal 2, and may store information to support these capabilities. The MSC may be connected to one or more access networks 6, as well as other public networks such as, for example, a public switched telephone network (PSTN) (not shown) or an integrated services digital network (ISDN) (not shown). Visitor location register (VLR) 9 is used to retrieve information for handling voice communications to or from a visiting subscriber The VLR may be configured within MSC 5, and may serve more than one MSC.

A user identity is assigned to the home location register (HLR) 10, which maintains for record purposes data such as subscriber information (e.g., electronic serial number), mobile directory number, profile information, current location, and authentication period. Authentication center (AC) 11 manages authentication information related to mobile terminal 2. The AC may be within HLR 10 and may serve more than one HLR. The interface between MSC 5 and the HLR 10 and AC 11 is shown as an IS-41, standard interface 18.

The packet data serving node (PDSN) 12 portion of PSCN 8 provides routing for packet data traffic to and from mobile terminal 2. PDSN 12 establishes, maintains, and terminates link layer sessions to mobile terminal 2 and may interface with one or more access networks 6 and one or more PSCNs 8. Authentication, authorization and accounting (AAA) 13 server provides Internet protocol authentication, authorization, and accounting functions related to packet data traffic. Home agent (HA) 14 provides authentication of mobile terminal IP registrations, redirects packet data to and from foreign agent (FA) 15, and receives provisioning information for users from AAA server 13. HA 14 may also establish, maintain, and terminate secure communications to PDSN 12 and assign a dynamic IP address. The PDSN is shown communicating with AAA server 13, HA 14, and the Internet 16 via internal IP network 17.

In the exemplary embodiment shown in FIG. 1, wireless communication network 1 operates according to known specifications for 1xEV-DO, which utilizes CDMA communication techniques. It should be understood that operation of embodiments of the present invention is similarly also possible in other types of radio, and other, communication systems. Therefore, while the following description describes operation of an embodiment of the present invention with respect to the 1xEV-DO system, operation of an embodiment of the present invention can analogously be described with respect to any of various other types of communication systems. An example of mobile terminal 2 operable in a 1xEV-DO system in accordance with an embodiment of the present invention will be described in more detailed in connection with a later figure.

Transmissions from BTS 3 to mobile terminal 2 are called forward link transmissions. Likewise, transmissions from mobile terminal 2 to BTS 3 are called reverse link transmissions. In general, the forward link transmission includes a plurality of frames defined by system specifications. In the exemplary communication system, the signals are received substantially during the reception of a frame on a plurality of channels (forward link channels), generally having signals for a pilot channel, control channels, supplemental channels, and dedicated channels. The supplemental channels include interleaved and spread data signals. The dedicated channel contains signaling information about the data transmitted on the supplemental channels.

When a connection is opened, mobile terminal 2 may be assigned a forward traffic channel, a reverse traffic channel, and reverse power control channel. Multiple connections may occur during a single session. There are generally two connection states in a 1xEV-DO system; a closed connection and an open connection.

A closed connection refers to a state in which mobile terminal 2 is not assigned any dedicated air-link resources and communications between the mobile terminal 2 and access network 6 are conducted over the access channel and the control channel. An open connection refers to a state where mobile terminal 2 can be assigned the forward traffic channel, a reverse power control channel, and a reverse traffic channel, and communication between mobile terminal 2 and access network 6 is conducted over these assigned channels as well as over the control channel.

In accordance with embodiments of the present invention, various techniques will be described for adjusting or otherwise varying the reverse link power control step size of a mobile terminal. Three generalized embodiments will be addressed. These embodiments will be referred to as gradual step size changes, sharp changes of the step sizes for "instantaneous" step size changes, and probabilistic step size changes.

Figure 2:
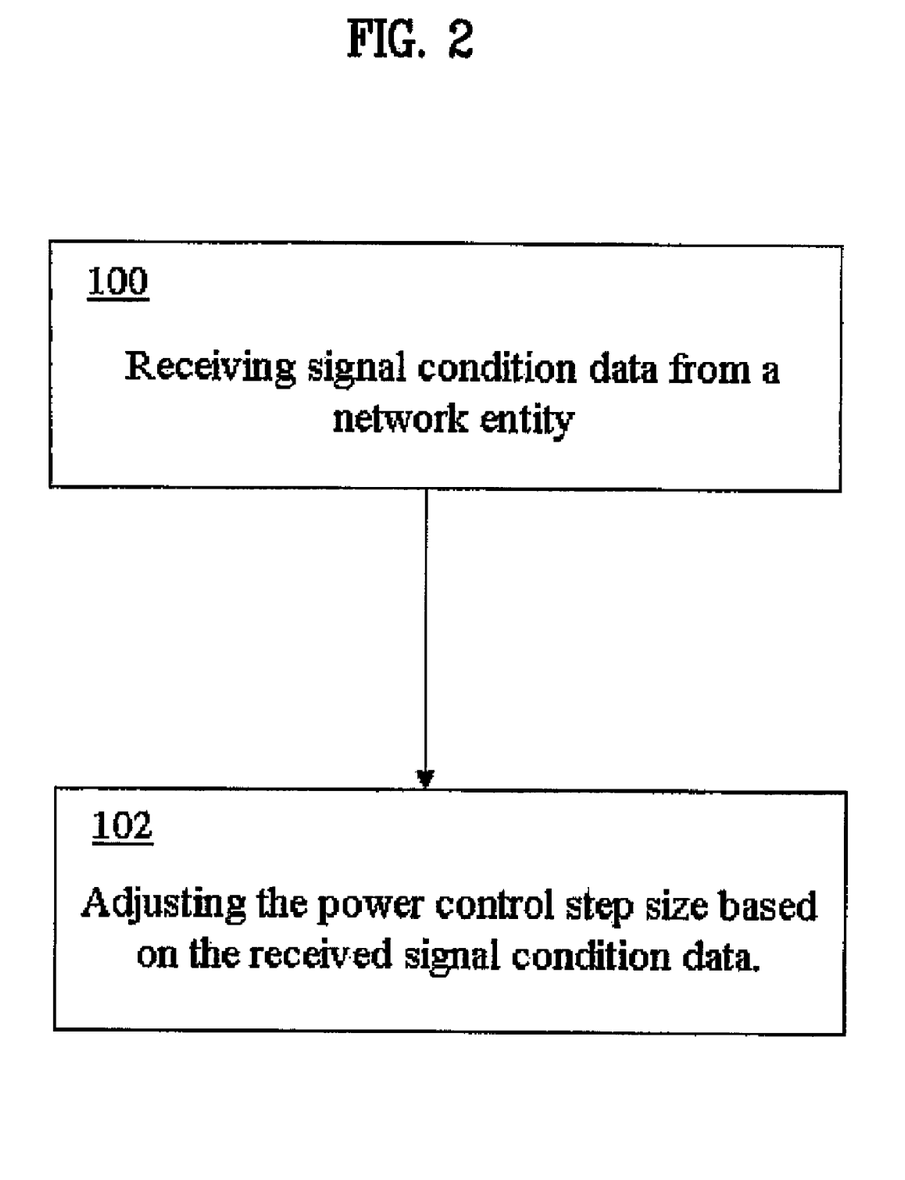
FIG. 2 is a flowchart depicting a method for adjusting step size in accordance with an embodiment of the present invention.

FIG. 2 is a flowchart depicting a method for adjusting step size in accordance with an embodiment of the present invention. Block 100 includes receiving signal condition data from a network entity. Examples of a network entity include any of the various components of access network 6 (FIG. 1). Block 102 includes adjusting power control step size based on the received signal condition data.

As will be described in more detail herein, various types of signal condition data received on the forward link from a network entity may be used as the basis for adjusting the power control step size. In general, signal condition data includes, for example, power level command history (power UP/power DOWN), acknowledgment (ACK) and negative acknowledgment (NACK) signaling received by the mobile terminal, a system load indicator (e.g., reverse activity bit (RAB)), a channel quality indicator (e.g., CQI lock condition or DRC lock condition (LOCK or no LOCK)), combinations thereof, and the like.

Additionally or alternatively, signal condition data may further include the recent transmit power of the mobile terminal, speed of the mobile terminal, history of received forward link pilot power, history of bit-error rates of the forward link traffic channel, and history of packet-error rates of the forward link traffic channel, among others. If desired, the set of available step sizes can be varied to include a defined number of step sizes.

Gradual power control step size adjustment, which may also be referred to as outer loop step size control, will be addressed first, There are several different techniques for achieving gradual power control step size. A first example is one in which the signal condition data, which is received by mobile terminal 2 on the forward link, includes power level commands (FIG. 2, block 100). These power level commands may individually include either a power UP command indicating that the mobile terminal is to increase power, or a power DOWN command indicating that the mobile terminal is to decrease power. Upon receiving and considering the power level commands, the mobile terminal may increase the reverse link power level step size if a predetermined consecutive number (e.g., 2, 3, 4, etc.) of the power level commands include a power UP command (FIG. 2, block 102). This consecutive number is also referred to as the run length.

A specific example of the just-described embodiment occurs when mobile terminal 2 receives three consecutive power UP commands. Such a scenario may result in an increase in the power control step size. Conversely, the step size may be decreased if a predetermined consecutive number (e.g., 2, 3, 4, etc.) of power level commands include a power DOWN command. The step size may alternatively be decreased if the run length of the power level control commands is less than a defined number. For instance, a run length of less than two (e.g., UP, DOWN, UP, DOWN) consecutive power level control commands may be used to indicate a decrease in step size.

In accordance with an embodiment, gradual power control step size adjustment may alternatively be based upon ACK/NACK signaling received on the forward link by the mobile terminal. In this embodiment, the signal condition data may include transmission control information such as an acknowledgement (ACK) indicating a previous transmission by the mobile terminal was successfully received by access network 6, or a negative-acknowledgement (NACK) indicating a previous transmission by the mobile terminal was not successfully received by the access network. Reverse link power control step size may therefore be increased if a first predetermined consecutive number of NACKs have been received. In contrast, step size may be decreased if a second predetermined consecutive number of ACKs have been received.

One possible variation is to track or otherwise identify the various subpacket transmissions which contain transmission control information. In this example, the step size may be decreased if the transmission control information includes an acknowledgement ACK in the first subpacket transmission.

Yet another technique for providing gradual power control step size adjustment may include using both power level command history (power UP/power DOWN) and ACK/NACK signaling. In this embodiment, the step size may be increased if a first predetermined consecutive number of power UP commands and a second predetermined consecutive number of NACKs are received. On the other hand, the step size may be decreased if a third predetermined consecutive number of power DOWN commands and a fourth predetermined consecutive number of ACKs are received.

A variation is to, once again, track or otherwise identify the various subpacket transmissions which contain transmission control information. In this example, however, the step size may be decreased if the transmission control information includes an ACK in the first subpacket transmission and a power DOWN command has been received. It is understood that timing of the received ACK and power level commands typically requires consideration in view of the delays usually associated with these parameters.

Still yet another technique for providing gradual power control step size adjustment includes using a system load indicator such as, for example, the reverse activity bit (AB). In this embodiment, adjustment (FIG. 2, block 102) of the step size may be correlated to a particular network load level. For instance, if the network is experiencing relatively high levels of activity, it may be desirable to carefully control the reverse link power levels. Consequently, adjustment of the power control step size of the mobile terminal may not be permitted when the RAB indicates a threshold level of activity. Alternatively, when this threshold level of activity is reached, the step size may be increased using the lowest permitted increase in step size.

In accordance with still further embodiments, gradual power control step size adjustment may be accomplished using signal condition data which includes a channel quality indicator such as, for example, DRC lock. For instance, mobile terminal 2 may receive from access network 6 the channel quality indicator. This indicator may indicate either a LOCK condition or a NO LOCK condition. A LOCK condition indicates that the network entity is receiving reverse link signaling from mobile terminal, and a NO LOCK condition indicates that the access network has not received reverse link signaling from the mobile terminal. Adjusting of the reverse link power control step size may therefore be accomplished as follows. First, the step size may be increased if the data rate control indicator indicates a NO LOCK condition for a first predetermined time period. Alternatively, the step size may be increased if the data rate control indicator indicates a LOCK condition for a second predetermined time period.

Some or all of the above techniques may be combined to provide additional options for gradual power control step size adjustment. One example of such an embodiment will now be described. This example utilizes signal condition data such as power level command history (power UP/power DOWN), ACK/NACK signaling, and channel quality indicators (e.g., DRC lock).

In this embodiment, the step size may be increased upon receiving a predetermined consecutive number of power UP commands, a predetermined consecutive number of NACKs, and the data rate control indicator indicates a NO LOCK condition for a predetermined time period. Step size may be decreased upon receiving a predetermined consecutive number of power DOWN commands, an ACK (after the first or later subpacket), and the data rate control indicator indicates a LOCK condition for a predetermined time period.

The forgoing embodiments have been described in the context of the mobile terminal receiving signal condition data in the forward link from a single carrier. However, such embodiments are not so limited and such disclosure applies also to, for example, multi-carrier 1xEV-DO (which is also known as NxEV-DO or Rev. B). For example, consider the embodiment in which step size may be increased upon receiving a predetermined consecutive number of negative-acknowledgement NACKs. In a multi-carrier implementation, a logical "OR" operation may be utilized such that if at least one of the carriers experiences a predetermined consecutive number of NACKs, then the step size is increased, This multi-carrier implementation may be utilized using any of the signal condition data disclosed herein.

A second generalized embodiment relates to sharp changes of step size adjustment, which is also referred to herein as "instantaneous" step size changes. This embodiment will be described in conjunction with the table shown in FIG. 3. This table includes possible values (ACK/NACK) for the first three responses on the acknowledgment channel (ACKCH). This example assumes a maximum of two re-transmissions (or, equivalently, a maximum of three sub-packet transmissions) for automatic repeat request (ARQ) operation. Various step sizes are shown correlated with various ACK/NACK responses and the received power control command (UP/DOWN). Each of these responses is typically contained in a subpacket transmitted in one of a plurality of separate packet transmissions. The power control command is likewise also received in a packet transmission received by the mobile terminal.

Figure 3:
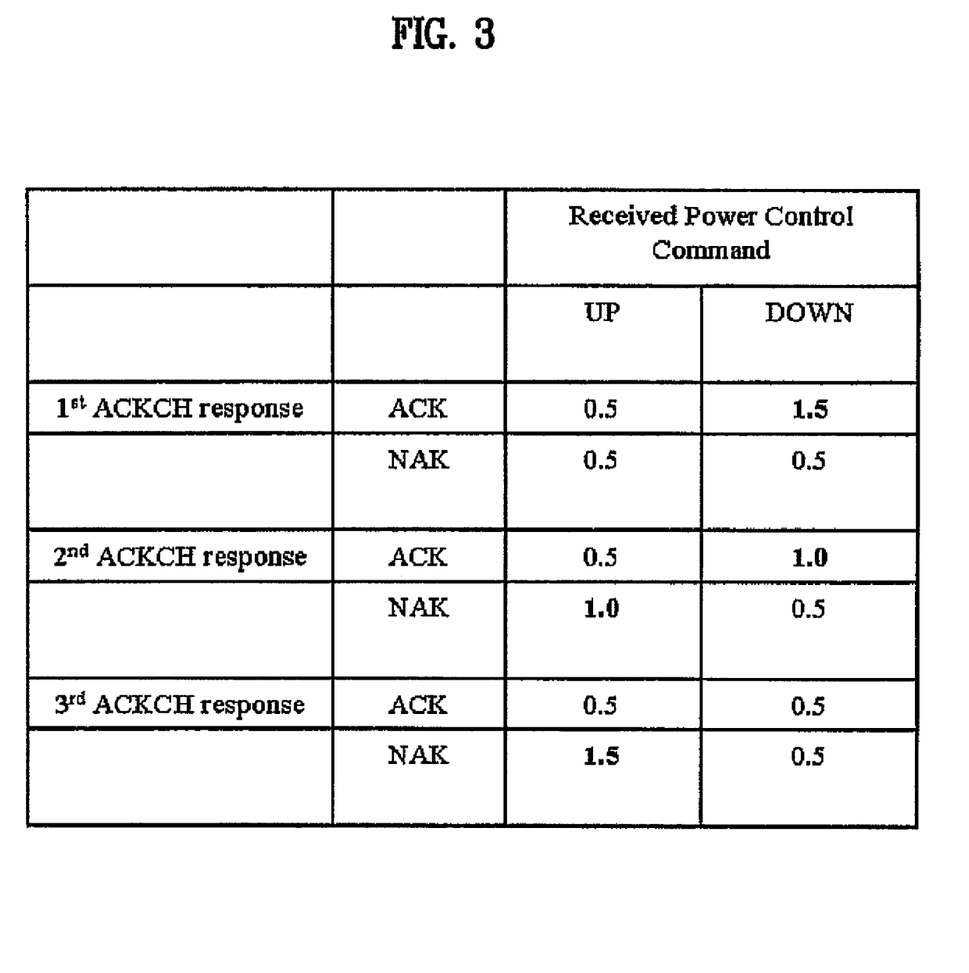
FIG. 3 depicts a table with various acknowledgment channel responses correlated with power control command values.

As this table illustrates, step size may be increased (from 0.5 , dB to either 1.0 dB or 1.5 dB) in either of two conditions. First, upon receiving an ACK in either a first or second subpacket, and a power DOWN command which is associated with either of the first or second subpacket. Second, upon receiving a NACK in a last-received subpacket, and a power UP command which is associated with the last-received subpacket.

Variations on the just-described embodiment are possible. For example, the step size may alternatively be increased if a defined number of power control commands (e.g., 2, 3, etc.), or other signal condition data parameters, has been received.

Figure 4:
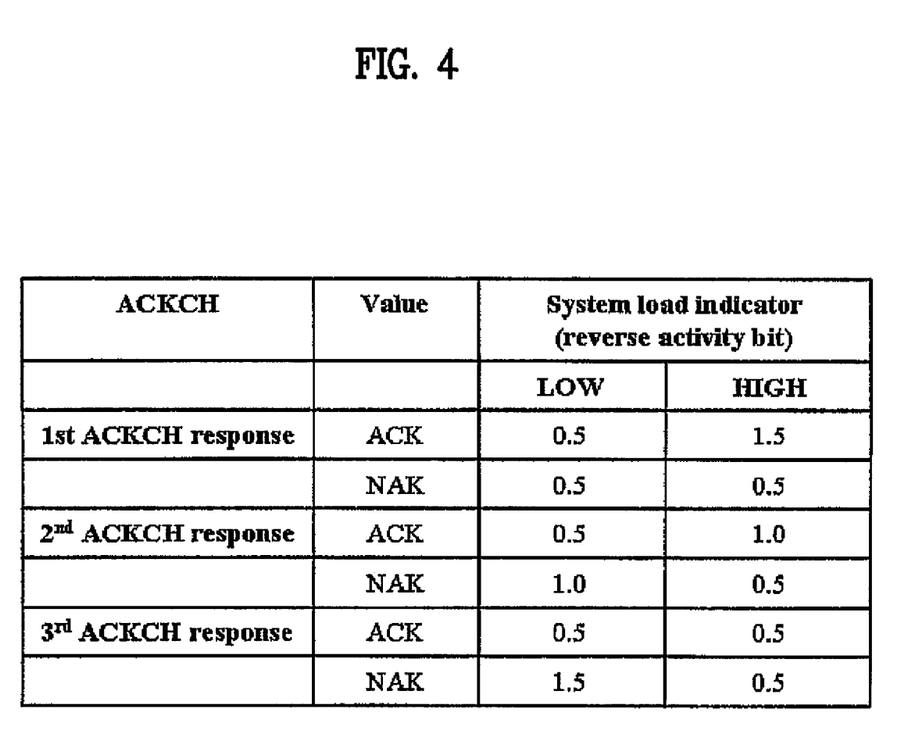
FIG. 4 depicts a table with various acknowledgment channel responses correlated with system load indicators.
Figure 5:
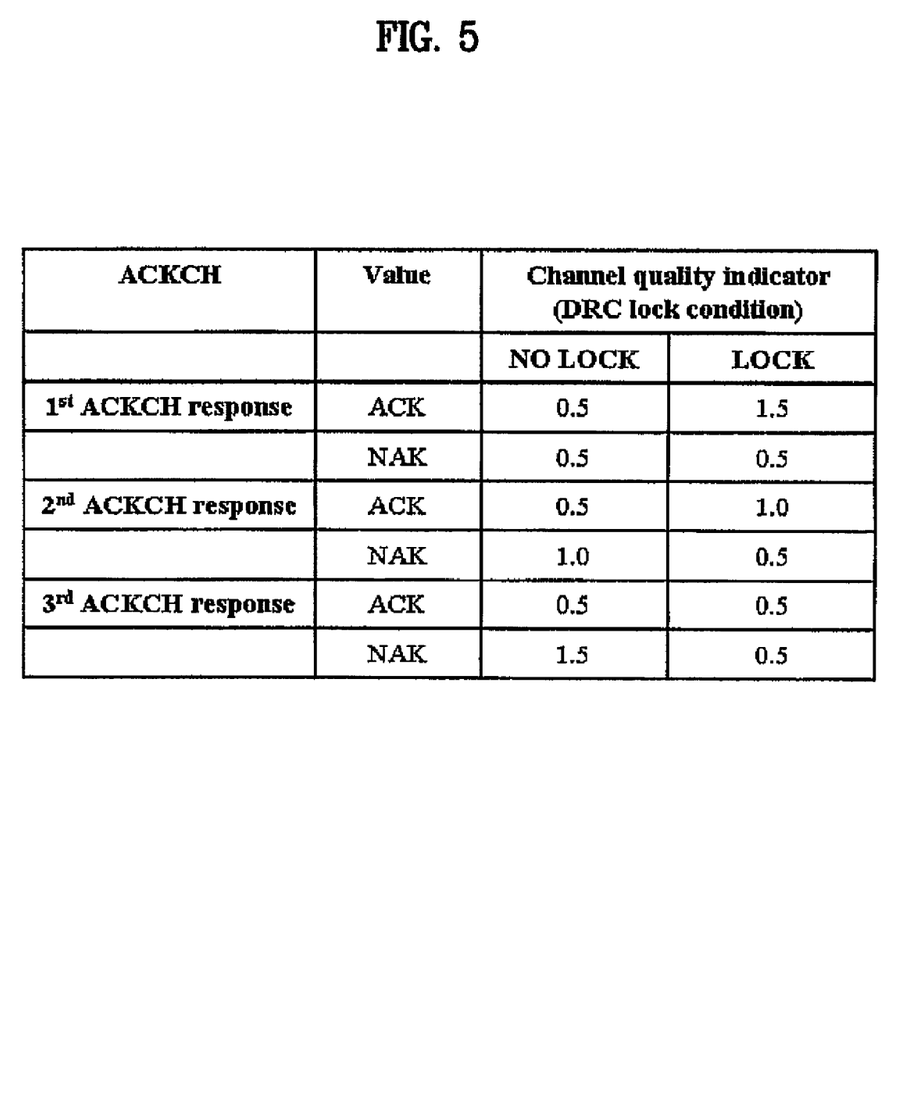
FIG. 5 depicts a table with various acknowledgment channel responses correlated with channel quality indicators.

Other possibilities include substituting the UP/DOWN parameters of the power control command with alternative signal condition data parameters such as system load indicators (e.g., reverse activity bit (RAB)) and channel quality indicators (e.g., DRC lock). Examples of such embodiments are show in the tables of FIGS. 4 and 5. In particular, FIG. 4 depicts a table with system load indicators (HIGH/LOW), and FIG. 5 depicts a table with channel quality indicators (LOCK/NO LOCK). In such embodiments, the step size may be increased in a manner previously described. Further embodiments include those which utilize combinations of one or more of the power control commands (FIG. 3), system load indicators (FIG. 4), and channel quality indicators (FIG. 5).

The forgoing embodiments have been described in the context of the mobile terminal receiving various signal condition data parameters from a single sector (or single carrier). However, such embodiments are not so limited and such disclosure applies also to the receiving of such data from multiple sectors (or multiple carriers). For example, consider the embodiment in which power control commands (power UP/DOWN) are utilized (FIG. 3). In a multi-sector implementation, for example, a logical "OR" operation may be utilized such that if received power commands from at least one of the sectors is a power DOWN command, then the resulting set (FIG. 3) is a power DOWN command. Such application may alternatively be applied to any of the other signal condition data parameters.

Another embodiment includes applying the various step size adjustments discussed in conjunction with FIGS. 2-5 to forward link power control. That is, adjustment of the step size of the forward link power control may alternatively be accomplished using the various techniques described with regard to the identified figures. For instance, referring to FIG. 3, the various ACK/NACK responses may be obtained from the reverse link acknowledgment channel, and the power control commands may be received from the mobile terminal.

In another aspect, the access network may utilize the history of power control commands sent to one or more mobile terminals operating within the network to determine future power control commands. The mobile terminal receives this coded power control command which is then used in conjunction with one or more previous power control commands to determine a new power output level.

For example, the mobile terminal may receive a predetermined consecutive number (e.g., 2, 3, 4, etc.) of power level commands from the access network which include a power UP command. In such a scenario, the mobile terminal may then use relatively larger power-up step sizes following each of the consecutively received power UP commands. The power control step sizes may be predetermined by the mobile terminal either alone or in cooperation with the network. Similar techniques may be utilized in power-down situations.

Figure 6:
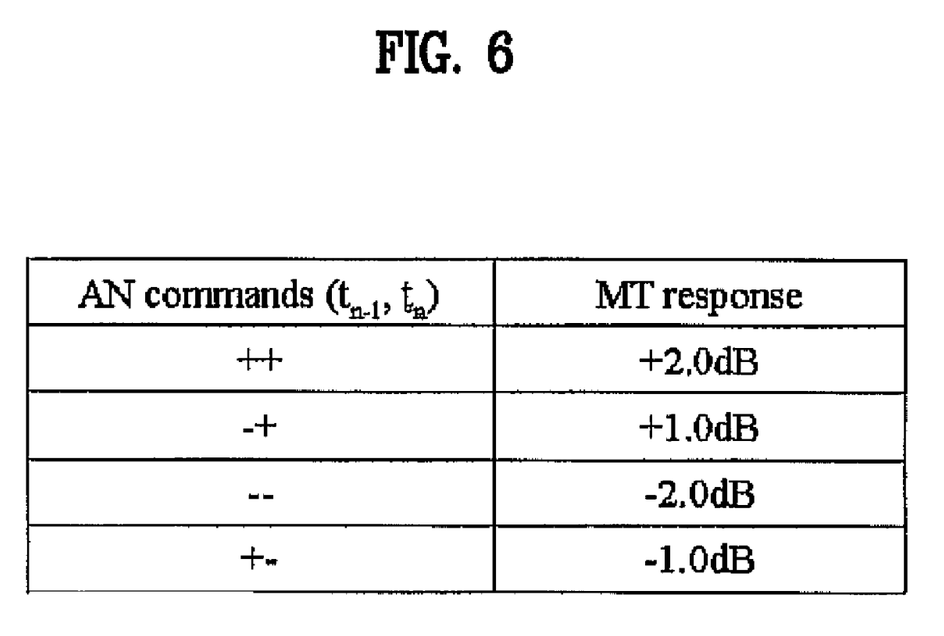
FIG. 6 depicts a table with various power control commands sent by the access network, and possible step size adjustments for which a mobile terminal may respond.
Figure 7:
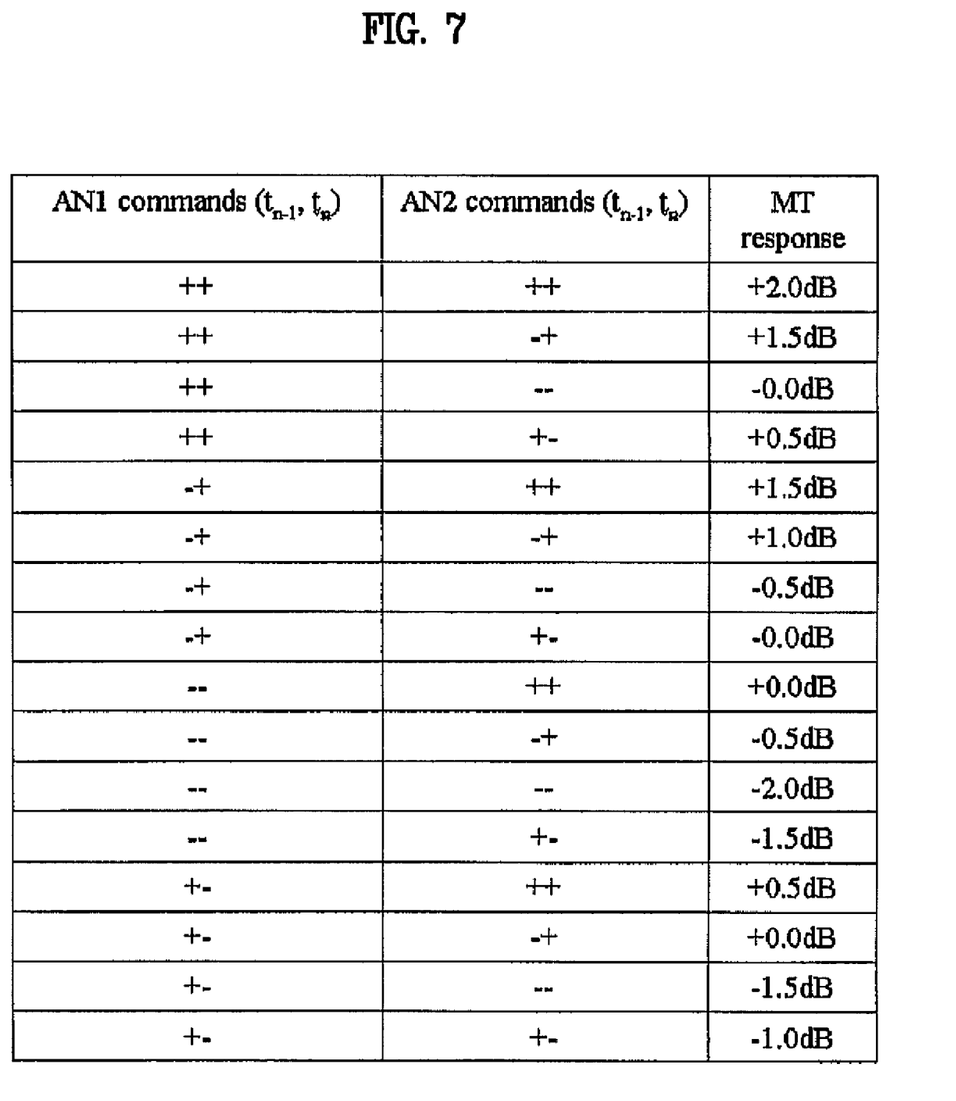
FIG. 7 depicts a table with various power control commands sent by two separate network entities, and possible step size adjustments for which a mobile terminal may respond.

An example of the foregoing is illustrated in FIGS. 6 and 7. In particular, FIG. 6 includes a table which depicts various power control commands sent by the access network, and possible step size adjustments for which the mobile terminal may respond. Only two consecutive power level commands from the network are illustrated, but the described strategy applies equally to the use of greater numbers of commands.

FIG. 7 includes a table which depicts various power control commands sent by two separate network entities, and possible step size adjustments for which the mobile terminal may respond. AN1 can represent the commands from one sector, and AN2 that from another sector. The mobile terminal will typically encounter such a scenario when located within the handoff region of the serving network entity. This example could be generalized for the situation where two or more sectors (or AN's) are in the active set of the mobile terminal.

A third generalized embodiment relates to probabilistic step size changes, and will be described in conjunction with the state diagram shown in FIG. 8. First of all, in Rev. A 1xEV-DO, for example, the rate of power control commands is reduced from 600 times/sec to 150 times/sec. It is understood that excessive power changes resulting from inaccurate information may cause degradation of system performance in the network. This may result from, for example, a variance of the rise over thermal (RoT) being higher than expected, or excessive power consumption in the mobile terminal. To compensate for any inaccuracies in determining the power control step size, weighted information may be used as part of the process for determining the power control step size. This process may be referred to as a probabilistic step size change, an example of which will now be described.

Initial probability is assigned by the network or determined by the MT when the session is negotiated, for example.

Updated probability may be calculated as follows:

Updated probability (p)=Initial probability+moving average of signal condition data.

Recall that signal condition data may include, for example, power level command history (power UP/power DOWN), ACK/NACK signaling received by the mobile terminal, a system load indicator (e.g., RAB), a channel quality indicator (e.g., DRC lock), combinations thereof, and the like.

Figure 8:
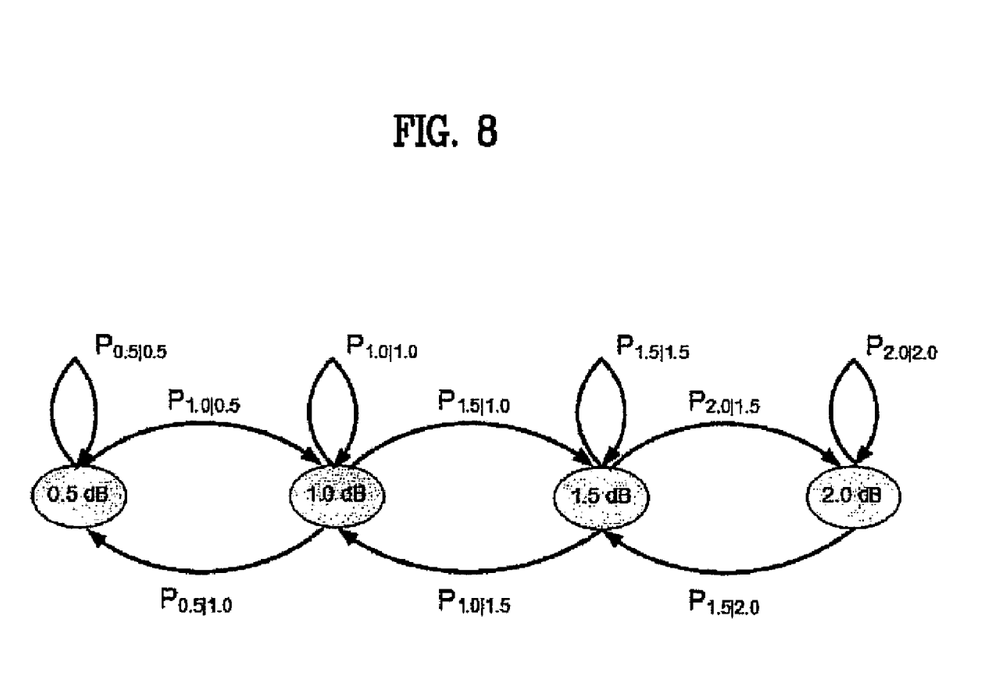
FIG. 8 is a state diagram showing probabilistic step size changes.

Referring now to the state diagram of FIG. 8, transitioning between four possible power control step sizes is shown based upon various transition probabilities. The example of FIG. 8 is described with regard to power control commands, but similar results may be obtained using any of the described types of signal condition data. For clarity, the transitions between step sizes are shown limited only to neighboring step sizes. However, alternatives are possible in which transition between any of the depicted step sizes is possible.

The particular method utilized for calculating the transition probabilities is not critical to embodiments of the present invention. By way of example only, two possible techniques for calculating transition probabilities will now be discussed.

In a first technique, transition probabilities may be determined based on the power control commands. In particular, a first operation may include setting a power control command observation window, and then pairing the power control commands occurring during this time. The next operation includes counting the number of pairs with alternating power control commands, such as (UP, DOWN) or (DOWN, UP). Another operation determines the probability ($\alpha$) using the following equation:

Probability ($\alpha$)=(number of pairs with alternating power control commands)/(total number of pairs).

The next operation provides for the grouping of the power control commands by four, and then counting the number of four consecutive occurrences of the same power control commands as (UP, UP, UP, UP) or DOWN, DOWN, DOWN, DOWN).

Another operation determines the probability as follows:

Probability ($\lambda$)=(number of groups with the same power control commands)/(total number of groups with four elements).

Another operation includes calculating the transition probability matrix using, for example, the following:

$$P = \begin{bmatrix} \alpha & 1-\alpha & 0 & 0 \\ \alpha & 1-\alpha-\lambda & \lambda & 0 \\ 0 & \alpha & 1-\alpha-\lambda & \lambda \\ 0 & 0 & 1-\lambda & \lambda \end{bmatrix}$$

where $\alpha = P_{0.5/0.5}$, and $\lambda = P_{2/2}$.

The above operations may be repeated (exclusive of the setting of the observation window) by sliding the observation window by predetermined power control commands. A final operation includes obtaining a moving average with the previously obtained transition probability.

A second technique for calculating the transition probabilities will now be discussed. A first operation includes setting the power control commands observation window. Next, the run-length of the same power control commands may be counted. For example, run-length of (UP, DOWN, UP) is one, and a run-length of (UP, UP, UP) is three.

If the observed run-length is equal to one, then:
$\alpha = 1$ or smaller;

If the observed run-length is equal to the cardinality of power control commands in the observation window, then:
$\alpha = 0$, or larger.

Another operation assigns the probabilities to each run-length from the function that connects one at run-length of one, and zero at run-length of the cardinality of power control commands in the observation window.

The function may be linear, such as, for example,
Probability=$-(\frac{1}{2},)(\text{run-length}-1,)+1$.

The function may also be exponential, such as, for example,
Probability=$e-(\text{run-length}-1,)U(1,-\text{run-length})$ where U is a unit-step function.

Another operation includes sliding the observation window by predetermined power control commands. Lastly, probability may be recomputed and the average may be obtained by the previously obtained probability.

In the above-two examples, a grouping of two and four power control commands and a run-length of three was assumed, However, the groupings and run-length may be varied to accommodate a desired trade-off between accuracy and complexity.

Moreover, initial probability may be assigned differently to each user (e g., dedicated probabilistic power control), to a group of users (e.g., group-wise probabilistic power control), the same to all users (common probabilistic power control), depending on the user grade (e.g., platinum, gold, silver, or bronze), or based upon quality of service (QoS) requirements.

A number of alternatives for adjusting the power control step size are possible. One option is to generalize the described techniques to accommodate soft or softer hand off scenarios. For example, given a three-way hand off, the mobile terminal could receive three different power level commands. The selected step size could therefore include some function of the three commands. In a specific case of the mobile terminal receiving three power DOWN commands, the step size may be selected using the step size which has the largest absolute value. Alternatively, if three power UP commands are received, then the step size associated with the serving sector is used.

In one aspect, different sets of step sizes may be implemented such that the sets of available step sizes vary among various mobile terminals. The different sets may be associated with traffic or application, for example, of the mobile terminal. For instance, for VoIP, a relatively large set of step sizes may be used. Smaller sets of step sizes may be used for data. As another example, a mobile terminal experiencing relatively poor channel conditions may be assigned a large set of step sizes with a large range. On the other hand, a mobile terminal experiencing acceptable or high-quality channel conditions, may be assigned a relatively smaller step size range.

As an alternative to the use of channel condition, the step size set may be determined by the class of the mobile terminal (e.g., platinum, gold, silver, or bronze), or the network location (e.g. highway vs. residential). Note further that various aspects may be useful for the design of the power amplifier utilized by the mobile terminal such that reduced transmission power requirements may be achieved, thus reducing overall costs for manufacturing the mobile terminal, The set of step sizes may also be defined using different techniques. As an example, actual sizes may be specified (e.g., 0.5, 1, 1.5, 2, ), or the maximum the size can be specified by the maximum step size (e.g., 2, ) along with a differential step size of 0.5 , dB, for example. Either approach provides useful sets of step sizes. If desired, finer quantization levels (e.g., units of 0.1 , dB or finer) for the different steps may also be implemented.

If it is necessary for the network to know the step size used by the mobile terminal, this can be determined using various techniques. For instance, the change in step size may be sent via upper layer messaging from the mobile terminal to the network. Alternatively, the mobile terminal may be constrained to determine the step size based on statistics observed from only the serving sector (i.e., ignoring statistics from the non-serving sectors). Assuming that the signal condition data (e.g., power control commands, ACK/NACKs, etc.) are received correctly, the network can apply the same techniques that the MT does for determining the step size. That is, the mobile terminal can also determine step size using any of the techniques disclosed herein. Moreover, in addition to having mobile terminal specific step size control, the step size can alternatively be sector-specific or network-specific, Another approach for controlling step size is for the access network to make this calculation and then send the calculated step size to the mobile terminal via upper layer or MAC messages. For example, during a call session, the access network can determine step size using any of the techniques disclosed herein, and then send the desired step size to the mobile terminal in an appropriate message.

Figure 9:
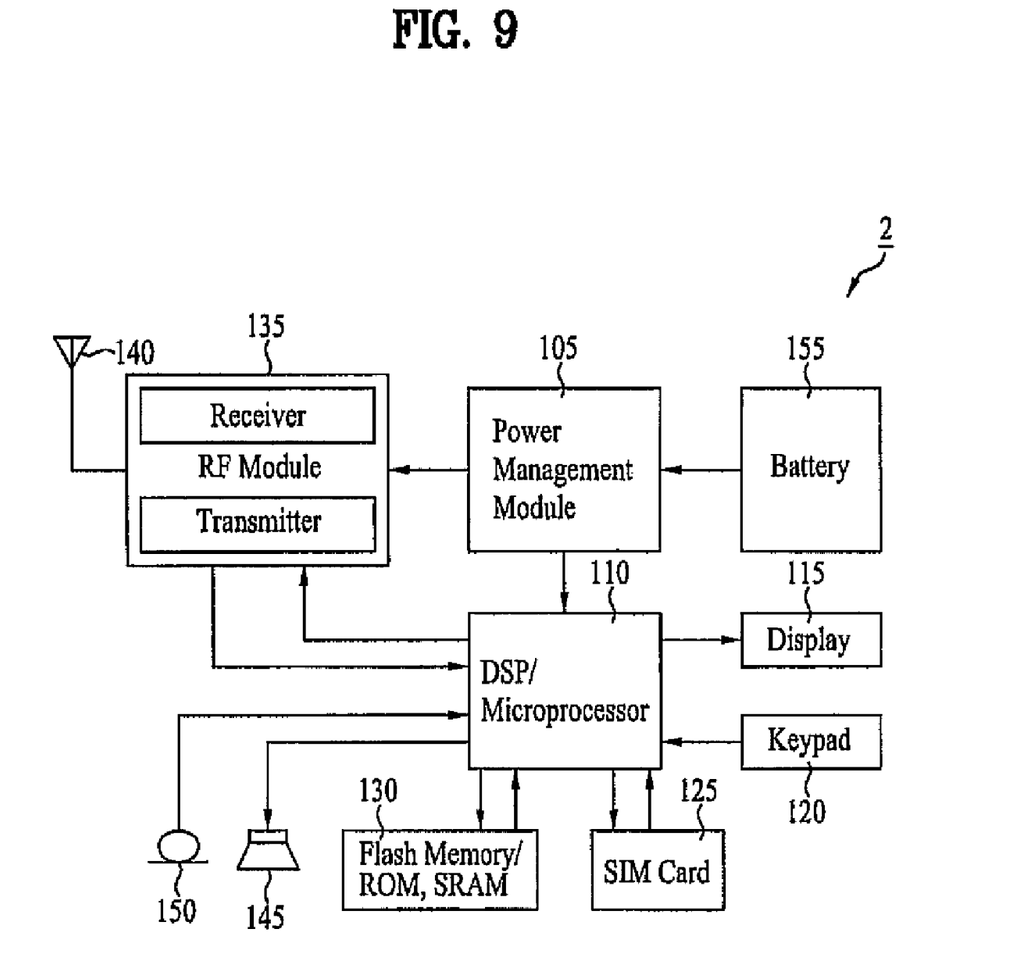
FIG. 9 is a block diagram of a mobile terminal.

FIG. 9 is a block diagram of mobile terminal 2. The mobile terminal includes processor (or digital signal processor) 110, RF module 135, power management module 105, antenna 140, battery 155, display 115, keypad 120, memory 130, subscriber identity module (SIN card 125 (which may be optional), speaker 145, and microphone 150.

A user enters instructional information, such as a telephone number, for example, by pushing the buttons of keypad 120 or by voice activation using microphone 150. Processor 110 receives and processes the instructional information to perform the appropriate function, such as to dial the telephone number. Operational data may be retrieved from SIM card 125 or memory module 130 to perform the function. Furthermore, the processor may display the instructional and operational information on display 115 for the user's reference and convenience.

Processor 110 issues instructional information to the RF module 135 to initiate communication, for example, and to transmit radio signals comprising voice communication data. RF module 135 comprises a receiver and a transmitter to receive and transmit radio signals. Antenna 140 facilitates the transmission and reception of radio signals. Upon receiving radio signals, the RF module may forward and convert the signals to the baseband frequency for processing by processor 110. The processed signals would be transformed into audible or readable information outputted via speaker 145, for example. The processor also includes protocols and functions necessary to perform the various processes described herein with regard to cdma2000 or 1xEV-DO systems.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for adjusting power control step size of a mobile terminal, said method comprising:
receiving signal condition data from a network entity; and
adjusting said power control step size based on said signal condition data,
wherein said signal condition data comprises transmission control information parameters which all include either:
an acknowledgement (ACK) indicating a previous transmission by said mobile terminal was successfully received by said network entity, or
a negative-acknowledgement (NACK) indicating a previous transmission by said mobile terminal was not successfully received by said network entity, and
wherein said adjusting further comprises:
increasing said step size if a first predetermined consecutive number of said transmission control information parameters include said NACK; and
decreasing said step size if a second predetermined consecutive number of said transmission control information parameters include said ACK.

2. A method for calculating power control step size of a mobile terminal, said method comprising:
determining signal condition data relating to said mobile terminal;
adjusting said power control step size based on said signal condition data; and
communicating said power control step size to said mobile terminal,
wherein said signal condition data comprises transmission control information parameters which all include either:
an acknowledgement (ACK) indicating a previous transmission by said mobile terminal was successfully received by said network entity, or
a negative-acknowledgement (NACK) indicating a previous transmission by said mobile terminal was not successfully received by said network entity, and
wherein said adjusting further comprises:
increasing said step size if a first predetermined consecutive number of said transmission control information parameters include said NACK; and
decreasing said step size if a second predetermined consecutive number of said transmission control information parameters include said ACK.

3. A method for adjusting power control step size of a mobile terminal, said method comprising:
receiving signal condition data from a network entity; and
adjusting said power control step size based on said signal condition data,
wherein said signal condition data comprises transmission control information parameters from the network entity which all include either:
an acknowledgement (ACK) indicating a previous transmission by said mobile terminal was successfully received by said network entity, or
a negative-acknowledgement (NACK) indicating a previous transmission by said mobile terminal was not successfully received by said network entity, and
wherein said adjusting further comprises:
receiving power level commands from said network entity which all include either:
a power UP command indicating that said mobile terminal is to increase power, or
a power DOWN command indicating that said mobile terminal is to decrease said power, and
increasing said step size if a first predetermined consecutive number of said power level commands include said power UP command and a second predetermined consecutive number of said transmission control information parameters include said NACK; and
decreasing said step size if a third predetermined consecutive number of said power level commands include said power DOWN command and a fourth predetermined consecutive number of said transmission control information parameters include said ACK.

4. A method for adjusting power control step size of a mobile terminal, said method comprising:
receiving signal condition data from a network entity; and
adjusting said power control step size based on said signal condition data,
wherein said signal condition data comprises a channel quality indicator which includes either:
a lock condition indicating that said network entity receives reverse link signaling from said mobile terminal, or
a no lock condition indicating that said network entity has not received reverse link signaling from said mobile terminal, and wherein said adjusting further comprises:
increasing said step size if said channel quality indicator indicates said no lock condition for a first predetermined time period; and
decreasing said step size if said channel quality indicator indicates said lock condition for a second predetermined time period.

5. A method for adjusting power control step size of a mobile terminal, said method comprising:
receiving signal condition data from a network entity; and
adjusting said power control step size based on said signal condition data,
wherein said signal condition data comprises transmission control information for subpackets transmitted in a plurality of packet transmissions, in which said transmission control information for each of said plurality of packet transmissions include either:
an acknowledgement (ACK) indicating a previous transmission by said mobile terminal was successfully received by said network entity, or
a negative-acknowledgement (NACK) indicating a previous transmission by said mobile terminal was not successfully received by said network entity; and
wherein said adjusting further comprises:

receiving a power level command for each of said plurality of packet transmissions from said network entity, in which each of said power level commands include:
    a power UP command indicating that said mobile terminal is to increase power, or
    a power DOWN command indicating that said mobile terminal is to decrease said power; and wherein said adjusting comprises:
increasing said step size if:
    said transmission control information associated with a first or second subpacket of one of said plurality of packet transmissions includes said ACK, and a power level command associated with said first or second plurality of packet transmissions includes said power DOWN command, or
    said transmission control information associated with a last-received subpacket of said plurality of packet transmissions includes said NACK, and a power level command associated with said last-received subpacket includes said power UP command.

6. A method for adjusting power control step size of a mobile terminal, said method comprising:
receiving signal condition data from a network entity; and
adjusting said power control step size based on said signal condition data,
wherein said signal condition data comprises transmission control information for subpackets transmitted in a plurality of packet transmissions, in which said transmission control information for each of said plurality of packet transmissions include either:
    an acknowledgement (ACK) indicating a previous transmission by said mobile terminal was successfully received by said network entity, or
    a negative-acknowledgement (NACK) indicating a previous transmission by said mobile terminal was not successfully received by said network entity; and
wherein said adjusting further comprises:
    decreasing said step size if said transmission control information associated with a first subpacket of said plurality of packet transmissions includes said ACK.

7. A method for adjusting power control step size of a mobile terminal, said method comprising:
receiving signal condition data from a network entity; and
adjusting said power control step size based on said signal condition data,
wherein said signal condition data comprises transmission control information for subpackets transmitted in a plurality of packet transmissions, in which said transmission control information for each of said plurality of packet transmissions include either:
    an acknowledgement (ACK) indicating a previous transmission by said mobile terminal was successfully received by said network entity, or
    a negative-acknowledgement (NACK) indicating a previous transmission by said mobile terminal was not successfully received by said network entity; and
wherein said adjusting further comprises:
    decreasing said step size if said transmission control information associated with a first subpacket of said plurality of packet transmissions includes said ACK and a power level command associated with said first subpacket includes a power DOWN command.

8. A method for adjusting power control step size of a mobile terminal, said method comprising:
receiving signal condition data from a network entity; and
adjusting said power control step size based on said signal condition data,
wherein said adjusting comprises:
    determining step size transition probabilities for each of a plurality of step sizes based upon said signal condition data; and
    increasing or decreasing said step size based upon said transition probabilities.

9. A method for calculating power control step size of a mobile terminal, said method comprising:
determining signal condition data relating to said mobile terminal;
adjusting said power control step size based on said signal condition data; and
communicating said power control step size to said mobile terminal,
wherein said signal condition data comprises transmission control information parameters from the network entity which all include either:
    an acknowledgement (ACK) indicating a previous transmission by said mobile terminal was successfully received by said network entity, or
    a negative-acknowledgement (NACK) indicating a previous transmission by said mobile terminal was not successfully received by said network entity, and
wherein said adjusting further comprises:
    receiving power level commands from said network entity which all include either:
        a power UP command indicating that said mobile terminal is to increase power, or a power DOWN command indicating that said mobile terminal is to decrease said power, and
    increasing said step size if a first predetermined consecutive number of said power level commands include said power UP command and a second predetermined consecutive number of said transmission control information parameters include said NACK; and
    decreasing said step size if a third predetermined consecutive number of said power level commands include said power DOWN command and a fourth predetermined consecutive number of said transmission control information parameters include said ACK.

10. A method for calculating power control step size of a mobile terminal, said method comprising:
determining signal condition data relating to said mobile terminal;
adjusting said power control step size based on said signal condition data; and
communicating said power control step size to said mobile terminal,
wherein said adjusting comprises:
    determining step size transition probabilities for each of a plurality of step sizes based upon said signal condition data; and
    increasing or decreasing said step size based upon said transition probabilities.

* * * * *